Dec. 24, 1957  D. M. GURNEY  2,817,728
DIRECTION SIGNAL

Filed Nov. 14, 1955  2 Sheets-Sheet 1

INVENTOR.
David M. Gurney
BY Paul Fitzpatrick
ATTORNEY

Dec. 24, 1957 D. M. GURNEY 2,817,728
DIRECTION SIGNAL
Filed Nov. 14, 1955 2 Sheets-Sheet 2

INVENTOR.
David M. Gurney
BY Paul Fitzpatrick
ATTORNEY

United States Patent Office 2,817,728
Patented Dec. 24, 1957

2,817,728

DIRECTION SIGNAL

David M. Gurney, Fosters, Mich., assignor to General Motors Corporation, Detroit, Mich., a corporation of Delaware Application November 14, 1955, Serial No. 546,460

6 Claims. (Cl. 200—61.35)

This invention relates to direction signal switch mechanisms and more particularly to manually set automatically reset mechanisms adapted for use in conjunction with automotive steering wheels.

An object of the invention is to provide an improved direction signal switch mechanism.

Another object is to provide a direction signal switch mechanism which is extremely compact.

A further object is to provide a direction signal switch mechanism adapted for disposition in an annular housing adjacent the base of a vehicle steering wheel, the mechanism being so constructed and arranged as to occupy but a small portion of the space in the annular housing and thereby reduce interference with other mechanisms associated with the vehicle steering column.

Still a further object is to provide a device of the stated character which is entirely self-contained and, therefore, readily installed or removed.

Yet another object is to provide a direction signal switch mechanism wherein the circuit controlling switch and the operating mechanism therefor are disposed in a single casing or cartridge.

Still a further object is to provide a manually set and automatically reset switch operating mechanism including structure capable of overcoming temporary obstructions without damage to the mechanism.

These and other objects and advantages of the invention will become more fully apparent as reference is had to the accompanying specification and drawings wherein.

Figure 1:
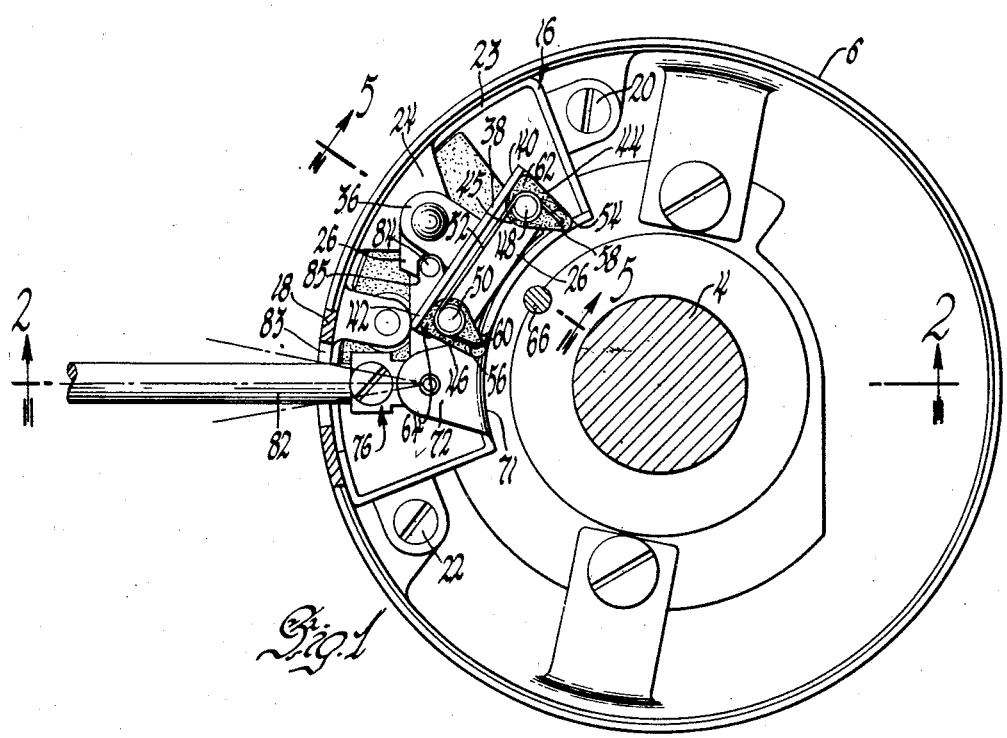
Fig. 1 is a plan view, partly in section, illustrating the form and arrangement of the invention, the parts being illustrated in the neutral position.
Figure 2:
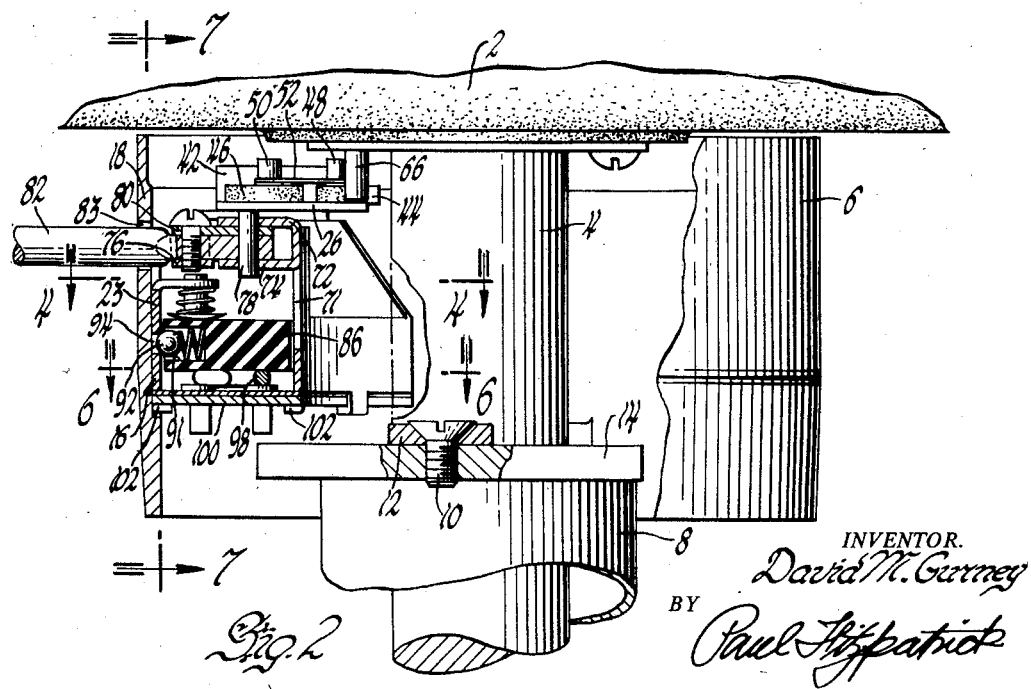
Fig. 2 is a side elevational view, partly in section, and with parts broken away looking in the direction of arrows 2—2 of Fig. 1.
Figure 3:
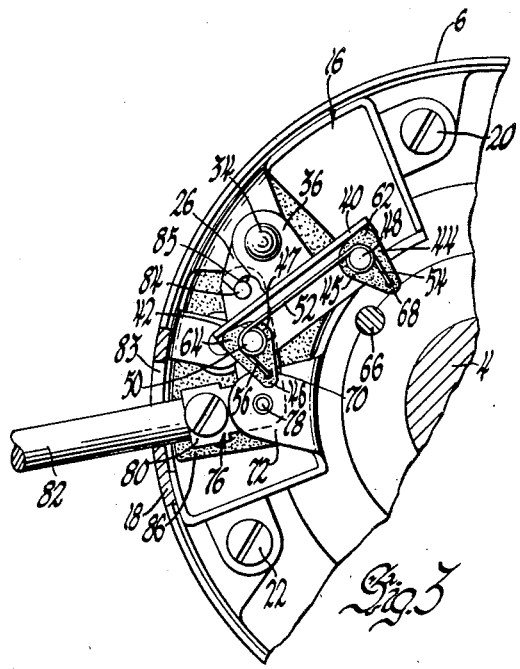
Fig. 3 is a fragmentary plan view, partly in section, similar to Fig. 1, illustrating the arrangement of parts when the mechanism is in the left turn signaling position.
Figure 5:
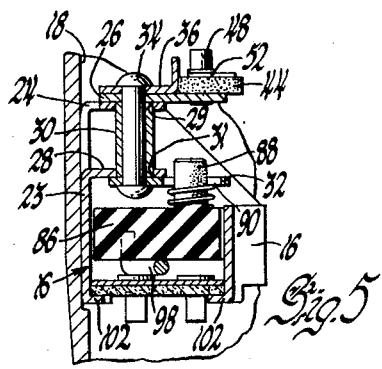
Fig. 5 is a fragmentary sectional side elevational view, looking in the direction of arrows 5—5 of Fig. 1.

Referring now to the drawings and particularly Figs. 1 and 2, the reference numeral 2 designates generally the hub portion of a vehicle steering wheel. Steering wheel 2 is connected to the upper end of a rotatable steering shaft 4 in the conventional manner. Disposed axially downwardly adjacent hub 2 in concentric surrounding relation with shaft 4 is an enlarged annular housing 6. Housing 6 overlaps the upper end of steering column 8 which also surrounds steering shaft 4. Housing 6 is connected to steering shaft 4 by means of a machine screw 10, which threadably connects the web portion 12 of housing 6 to the upper end flange 14 of steering column 8. Disposed in one quadrant of annular housing 6 is a relatively deep one-piece sheet metal casing or cartridge 16. Cartridge 16 is arcuate in form, as seen in the plan view, and is secured against the arcuate inner side wall 18 of housing 6 by machine screws 20 and 22. At the upper edge of its outer side wall 23, cartridge 16 is formed with a horizontal inwardly extending tab 24 to which is pivotally connected a generally T-shaped operating plate 26. As seen in Fig. 5, side wall 23 of cartridge 16 is lanced to form a second horizontal tab 28 which is vertically aligned with and parallel to tab 24. A tubular member 30 extends between aligned apertures 29 and 31 formed in tabs 24 and 28. A switch engaging lever 32 is angularly aligned with T-shaped operating member 26 and is connected for movement therewith by means of a rivet 34. Since tubular member 30 is equal in length to the distance between the outer faces of tabs 24 and 28, it will be evident that rivet 34 may rigidly secure operating plate 26 and plate 32 to tubular member 30 without interfering with freedom of rotation of tubular member 30 in the aligned apertures of tabs 24 and 28. As seen in Fig. 5, rivet 34 also serves to secure a generally T-shaped spring member 36 against the upper surface of operating plate 26. As seen in Fig. 1, T-shaped spring member 36 is formed with a vertically directed transversely extending portion 38 which parallels the rear edge of operating plate 26. Each end of portion 38 forms a relatively stiff flexible abutment 40 and 42, the purpose of which will be described shortly. Disposed at opposite ends of plate 26 adjacent abutments 40 and 42 are a pair of generaly triangular pawls 44 and 46 which are pivotally mounted respectively on vertically extending studs 48 and 50 carried by member 26. A wire spring 52 extends between studs 48 and 50 and has its opposite ends 54 and 56 disposed in apertures 58 and 60 formed in pawls 44 and 46. Spring 52 is wound around each stud 48 and 50 and biases pawls 44 and 46 in a clockwise and counterclockwise direction, respectively. Each pawl 44 and 46 is formed with a corner 62 and 64, respectively, so that the counterclockwise and clockwise rotation of pawls 44 and 46, respectively, is arrested by flexible abutments 40 and 42 of T-shaped spring 36. Abutments 40 and 42 thus establish the normal angular position of pawls 44 and 46 relative to plate 26. To permit rotation of pawls 44 and 46 counterclockwise and clockwise, respectively, the inner edges thereof are curved at 45 and 47 to provide clearance relative to portion 38 of spring 36. Accordingly, pawl 44 is yieldably rotatable against spring 52 in a counterclockwise direction, while pawl 46 is yieldably rotatable in a counterclockwise direction. Depending from the base of steering wheel 2 is a cancelling pin 66 which is adapted to rotate in a circular path with steering wheel 2 in an orbit clearing pawls 44 and 46. However, when plate 26 is swung in either direction from the central neutral position shown in Fig. 1, one or the other of pawls 44 and 46 moves to a position intersecting the orbit. Therefore, when operating plate 26 is swung, for example, in a clockwise direction, pawl 44 is arcuately displaced inwardly to a position intersecting the orbit of pin 66, as shown in Fig. 3. With operating plate 26 in the position shown in Fig. 3, counterclockwise rotation of the steering wheel 2 causes cancelling pin 66 to approach the outer end 68 of pawl 44 in a counterclockwise direction and progressively displace pawl 44 in a clockwise direction about stud 48 against the resistance of spring 52. Upon reversal of rotation of the steering wheel, pawl 66 approaches pawl 44 from a clockwise direction. However, since pawl 44 is normally prevented from rotating in a counterclockwise direction relative to plate 26 by interferences between shoulder 62 and the outer end 40 of spring 38, continued clockwise movement of pin 66 causes plate 26 to swing bodily about pivot 34 and, therefore, returns plate 26 to the neutral position shown in Fig. 1. However, should plate 26 be prevented from returning to neutral for any reason, the outer end 40 of spring 38 will yield under additional pressure and permit rotation of pawl 44 in a counterclockwise direction sufficient to clear the path of cancelling pin 66, thereby preventing damage to the mechanism. It will be understood that movement of plate 26 in the opposite direction from the neutral position will arcuately displace pawl 46 to a position intersecting the orbit of pin 66 and that the operation of pawl 46 responsive of pin 66 will be identical to that just described but in the reverse sense.

In order to manually adjust operating plate 26 to the neutral position and either of its right or left operating positions in accordance with the present invention, the inner arcuate wall 71 of cartridge 16 is provided with a pair of vertically aligned outwardly extending horizontal tabs 72 and 74. Disposed between tabs 72 and 74 is a generally L-shaped member 76. Member 76 is pivotal about a vertical stud 78 which extends between and is connected to tabs 72 and 74. At one end 80 thereof, member 76 is connected to an operating handle 82, which extends out of housing 4 through an aperture 83 formed therein. At its opposite end, member 76 is provided with a vertically extending pin 84. Pin 84 is adapted for meshed engagement with a notch 85 formed in one side edge of operating plate 26. Thus, when handle 82 is swung manually in a clockwise direction, pin 84 cams operating plate 26 in a counterclockwise direction, while counterclockwise movement of handle 82 cams plate 26 in a clockwise direction.

Figure 4:
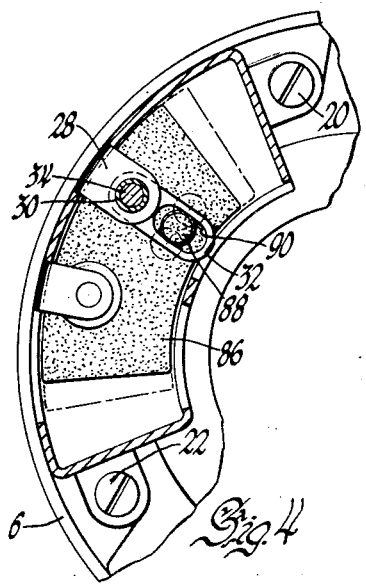
Fig. 4 is a fragmentary bottom plan view, partly in section, looking in the direction of arrows 4—4 of Fig. 2.

Slidably disposed in the lower portion of arcuate cartridge 16 is a contact bridge carrier 86. Carrier 86 is formed of non-conductive material and has an integral upstanding pin 88 formed thereon. Pin 88 extends through an elongated slot 90 formed in switch engaging lever 32, previously mentioned. As will be apparent particularly in Fig. 4, arcuate sliding movement of carrier 86 is imparted by swinging movement of operating lever 32. Since lever 32 and operating plate 26 are rigidly connected to tubular member 30, it will be apparent that swinging movement of plate 26 to its neutral right or left position will be accompanied by corresponding arcuate movement of bridge carrier 86 to a related arcuate position within cartridge 16. In order to resiliently detent the carrier 86 and operating plate 26 in neutral and each operating position, carrier 86 is formed with a radially extending bore 91 in which is disposed a spring urged ball 92. Ball 92 resiliently engages any of a plurality of circumferentially spaced openings 94 formed in the curved side wall 23 of cartridge 16.

Figure 6:
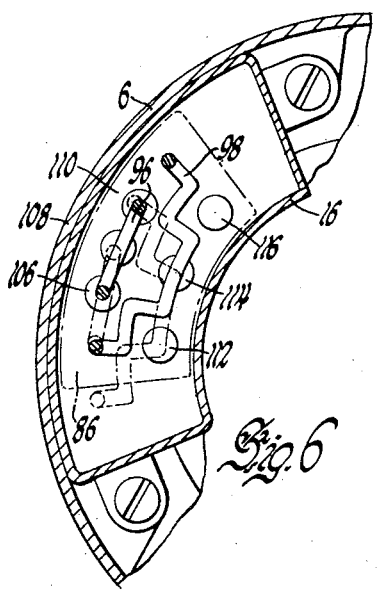
Fig. 6 is a fragmentary plan view, partly in section, looking in the direction of arrows 6—6 of Fig. 2.
Figure 7:
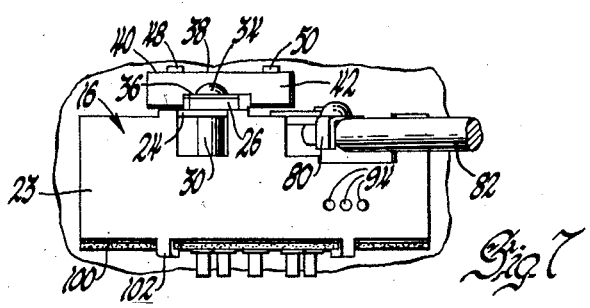
Fig. 7 is a fragmentary elevational view, looking in the direction of arrows 7—7 of Fig. 2.

Disposed on the lower surface of bridge carrier 86 are a pair of bridging members 96 and 98. Members 96 and 98 are formed of wire and have their opposite ends embedded in carrier 86 as shown in dotted lines in Fig. 5. Disposed over the open bottom of cartridge 16 is a contact carrier plate 100 which is retained in position by inwardly bent tabs 102 formed on cartridge 16. Carrier plate 100 has embedded therein two groups of contact terminals. One group comprises a contact 106, 108 and 110, which are aligned in an arcuate path, while the other group comprises a contact 112, 114 and 116, which are aligned in an arcuate path parallel with the arcuate path of contacts 106, 108 and 110. As seen in Fig. 6, when carrier 86 is in neutral, bridge 96 simultaneously engages contacts 106, 108 and 110, while bridging member 98 is bent in a symmetrical configuration which engages only contact 114. However, when carrier 86 is moved in a counterclockwise direction as seen in Fig. 6, bridging member 96 engages contacts 106 and 108, while member 98 simultaneously engages contacts 110, 114 and 112. Movement of carrier 86 in the opposite direction from neutral causes bridge 96 to engage contacts 108 and 110, while member 98 simultaneously engages contacts 106, 114 and 116.

While but one embodiment of the invention has been shown and described, it will be evident that numerous changes and modifications may be made therein. It is, therefore, to be understood that it is not intended to limit the invention to the embodiments shown, but only by the scope of the claims which follow.

I claim:

1. A direction signal switch mechanism comprising, a casing, a switch movable in said casing, a swingable switch operating member pivoted on said casing, a spring secured to said member, said spring having opposite free end portions, a pair of pawls pivotally connected to said operating member, one adjacent each of said free end portions, a second spring interconnecting said pawls and urging each of the latter in opposite directions, means on each pawl engaging the adjacent free end portion to define the normal angular position of said pawl, a rotatable cam, a lever pivoted on said casing at one side of said swingable operating member, and means on said lever meshing with said operating member for swinging the latter in opposite directions from a neutral position to positions placing one or the other of said pawls in the path of said rotatable cam.

2. A direction signal switch mechanism comprising, a casing, a switch movable in said casing, a swingable switch operating member pivoted on said casing, a spring secured to said member, said spring having opposite free end portions, a pair of pawls pivotally connected to said operating member, one adjacent each of said free end portions, a second spring interconnecting said pawls and urging each of the latter in opposite directions, means on each pawl engaging the adjacent free end portion to define the normal angular position of said pawl, a rotatable cam, a lever pivoted on said casing at one side of said swingable operating member, and means on said lever meshing with said operating member for swinging the latter in opposite directions from a neutral position to positions placing one or the other of said pawls in the path of said rotatable cam, said last mentioned means being arranged to cause reverse angular movement between said lever and said operating member.

3. A direction signal switch mechanism comprising, an open ended casing, a switch contact terminal plate secured over one end of said casing, a contact bridge carrier slidably disposed in said casing and movable from a neutral to signal operating position, a swingable operating member pivoted on said casing and operatively engaging said carrier, a double cantilever spring secured to said member, said spring having oppositely directed free end portions, a pair of pawls pivoted on said member, one adjacent each of said free end portions, a wire spring interconnecting said pawls and urging each of the latter in opposite directions, means on each pawl engageable with the adjacent free end portion of said cantilever spring to define the normal angular position of said pawl, a rotatable cam engageable with said pawls to restore said member to neutral position, a manually operable lever pivoted on said casing at one side of said swingable operating member, and offset means on said lever meshing with said operating member for swinging the latter in opposite directions from a centered position to positions placing one or the other of said pawls in the path of said rotatable cam.

4. A direction signal switch mechanism comprising, an open ended casing, a switch contact terminal plate secured over one end of said casing, a contact bridge carrier slidably disposed in said casing and movable from a neutral to signal operating position, a swingable operating member pivoted on said casing and operatively engaging said carrier, a double cantilever spring secured to said member, said spring having oppositely directed free end portions, a pair of pawls pivoted on said member, one adjacent each of said free end portions, a wire spring interconnecting said pawls and urging each of the latter in opposite directions, means on each pawl engageable with the adjacent free end portion of said cantilever spring to define the normal angular position of said pawl, a rotatable cam engageable with said pawls to restore said member to neutral position, a manually operable lever pivoted on said casing at one side of said swingable operating member, offset means on said lever meshing with said operating member for swinging the latter in opposite directions from a centered position to positions placing one or the other of said pawls in the path of said rotatable cam, and means carried by said contact carrier for resiliently detenting said mechanism in any of said positions.

5. A direction signal switch mechanism comprising, an open ended casing, a switch contact terminal secured over one end of said casing, a contact bridge carrier slidably disposed in said casing and movable from a neutral to signal operating positions, a swingable operating member pivoted on said casing and operatively engaging said carrier, a double cantilever spring secured to said member, said spring having oppositely directed free end portions, a pair of pawls pivoted on said member, one adjacent each of said free end portions, a wire spring interconnecting said pawls and urging each of the latter in opposite directions, means on each pawl engageable with the adjacent free end portion of said cantilever spring to define the normal angular position of said pawl, a rotatable cam engageable with said pawls to restore said member to neutral position, a manually operable lever pivoted on said casing at one side of said swingable operating member, offset means on said lever meshing with said operating member for swinging the latter in opposite directions from a centered position to positions placing one or the other of said pawls in the path of said rotatable cam, a spring pressed ball disposed in said carrier, and spaced means on a wall of said casing engageable by said ball to detent said mechanism in any of its positions of adjustments.

6. The structure defined in claim 5 wherein said spaced means comprises a plurality of spaced openings formed in said wall.

References Cited in the file of this patent

UNITED STATES PATENTS

| | | |
|---|---|---|
| 2,691,704 | Lincoln et al. | Oct. 12, 1954 |
| 2,731,525 | Redick | Jan. 17, 1956 |